Jan. 26, 1954   P. SCHAURTE   2,667,631
COMBINED COUNTING AND GAUGING DEVICE
Filed Aug. 13, 1951
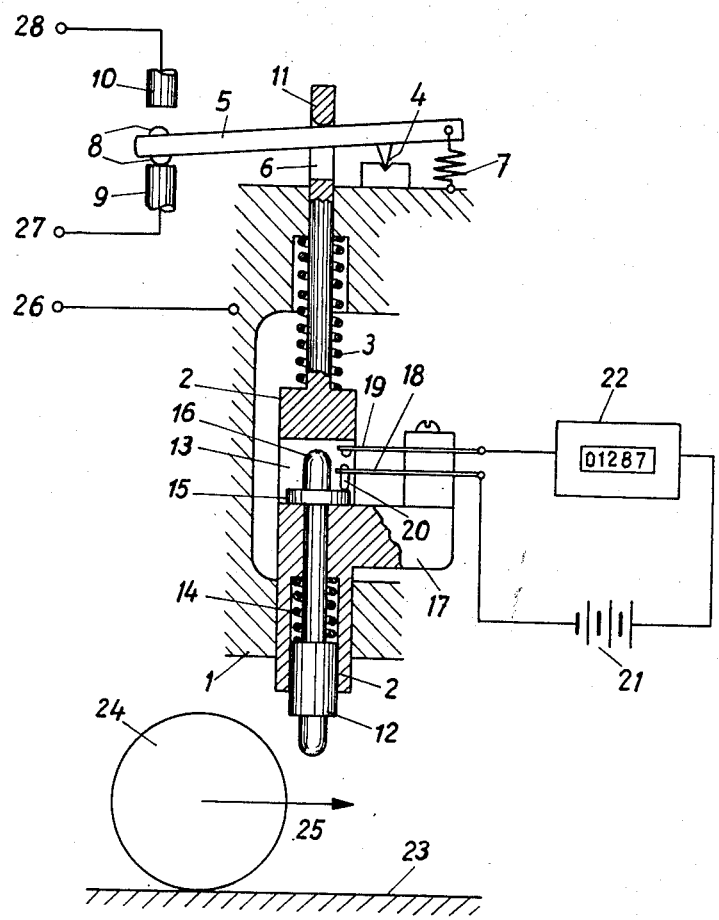
INVENTOR:
PAUL SCHAURTE

UNITED STATES PATENT OFFICE 2,667,631

COMBINED COUNTING AND GAUGING DEVICE

Paul Schaurte, Vaduz, Liechtenstein

Application August 13, 1951, Serial No. 241,606

8 Claims. (Cl. 340—265)

The present invention relates to a feeler gauge for checking geometrical tolerances or dimensions of work pieces and the like. In accordance with the invention the feeler gauge is characterized by an electrical contact cooperating with the feeler member of the gauge, said contact being arranged in such a way as to become effective before the actual measuring device when the feeler member is actuated.

For this purpose the feeler member may be arranged movably with respect to a part operatively connected with the measuring device itself so as to be actuated first and cooperate with the electrical contact in such a way that the latter is actuated by the relative movement.

The accompanying drawing shows a constructive example of the object of the present invention in the form of a limit gauge which is provided with electrical limit contacts and combined with an electrical device for counting the work pieces passing through the gauge.

As shown in the drawing a pin 2 is arranged vertically and axially movable in the frame 1. A spring 3 wound around the pin rests against the frame 1 on one hand and against a shoulder of the pin 2 on the other hand and tends to move the pin 2 in downward direction. The contact lever 5 is arranged rotatable in a vertical plane on the frame 1 of the feeler gauge by means of a knife edge bearing. The longer one of the arms of the contact lever 5 projects through an aperture 6 close to the upper end of the pin 2. The shorter arm of the contact lever 5 is subjected to the action of a tension spring 7 which tends to rotate the contact lever clockwise as shown in the drawing. At the end of the longer arm of the contact lever two electrical contact pieces 8 are arranged opposite each other which cooperate with fixed contact elements 9, 10. The latter also serve as stops for limiting the rotation of the contact lever. Under the action of the spring 3 the pin 2 rests against the contact lever 5 by means of a part 11 in such a way that the contact lever 5 is rotated against the action of the spring 7 until the lower one of its contact pieces 8 rests against the contact element 9.

A pin 12 serving as a feeler of the gauge is arranged axially movable in a longitudinal bore of the pin 2. The longitudinal bore extends from the lower end of the pin 2 up to a transversal opening 13 approximately at the middle of pin 2. A small spring 14 resting against the feeler pin 12 at one end and against the pin 2 at the other end tends to move the feeler 12 downwards. A ring 15 pressed on to the feeler pin 12 at its upper end butts against the lower wall of the opening 13 and prevents the feeler pin from falling out of the pin 2. When the feeler pin 12 is in its lower position its upper end 16 is a certain distance below the upper wall of the opening 13.

The pin 2 has a projection 17 to which an electrical contact formed by two contact springs 18, 19 is attached by means of insulating elements. In the example shown in the drawing the electrical contact is open when the feeler gauge is not in use. The lower contact spring 18 rests against the upper face of the ring 15 of the feeler pin by means of the pin 20 made from insulating material. The contact 18, 19 is part of an electrical circuit which may, for example, comprise a current source 21 and an electromagnetically operated counter 22.

A certain distance below the lower end of the feeler pin 12 a horizontal support plane 23 is provided on to which the object to be checked, e. g., a work piece 24 is to be placed.

Operation of the feeler gauge described is as follows. In normal or inactive position the parts of the gauge are arranged as shown in the drawing. If a piece 24 to be checked is moved on the support plane 23 in the direction of the arrow 25 underneath the feeler pin 12 the latter is lifted thus compressing the spring 14 while, at first, the pin 2 remains in its position. This relative movement with respect to the pin 2 causes the ring 15 to press the contact spring 18 upwards against the contact spring 19 whereby the electrical circuit comprising the counter 22 is closed and the counter is advanced by one unit. When the work piece 24 is moved further the upper end 16 of the feeler pin 12 butts against the upper wall of the opening 13. Thereupon, the pin 2 is also moved upwards against the action of the spring 3. The part 11 of the pin 2 thereby releases the contact lever 5 so that the latter can now rotate clockwise under the action of the spring 7 whereby the lower contact piece 8 is lifted off the fixed contact element 9. If the displacement of the pin 2 caused by the work piece 24 is large enough, the upper contact piece 8 of the contact lever 5 will at last butt against the fixed contact element 10. The pin 2 can then be moved for a certain distance farther upwards whereby the part 11 is lifted away from the contact lever 5. When the work piece 24 is removed from underneath the feeler pin 2 the individual parts of the gauge move in reverse order as described back into their initial position whereby only the counter retains its new position.

Preferably the distance between the two contact elements 9 and 10 is adjustable and set at such a value that the contact lever 5 ceases to touch the lower contact element 9 when the dimensions to be checked on the work piece reach the lower permissible limit and butts against the upper contact element 10 when the upper limit of the dimension is passed. By means of the contact elements 8, 9 and 10 of the actual measuring device of the gauge connected to the points 26, 27, 28, electrical circuits may be influenced by means of which it can be indicated to the operator of the gauge whether the dimension to be checked on the work piece is correct, too large, or too small.

The most important point about the feeler gauge shown is the fact that the contact 18, 19 becomes effective before the actual measuring device is actuated and even if the dimension to be checked on the work piece is too short to affect the measuring device. It is thus possible with the feeler gauge shown to count all work pieces passing the gauge, regardless of their tolerance position, by means of counter 22.

The contact 18, 19 can also be used for a number of other purposes. For instance, the points 26, 27 and 28 of the measuring circuits may be influenced in such a way that the dimension indicators are not actuated if the feeler pin 2 must be lifted prior to dimension checking of concave work pieces. For this purpose means can be provided on the feeler gauge which act directly on the pin 2, so that the feeler pin 12 can be lifted without moving with respect to the pin 2. The contact 18, 19 will then not be actuated and the circuit comprising this contact remains open whereby the indicators can be kept inoperative. These means can, for instance, be formed by a lever rotatable by hand.

In certain cases it may be advantageous to arrange the contact 18, 19 in such a way that it is opened when a work piece is pushed under the feeler pin.

The actual measuring device of the gauge shown is a limit gauge, especially an electrical contact gauge since the tolerance limits of the geometrical dimension to be checked are determined by the opening and closing of electrical contacts. Depending on the purpose of the feeler gauge other types of measuring devices could also be used.

I claim:

1. In a device of the character described, the combination of first electric circuit means including an electrically operated counter, with second electric circuit means including an electrically operated dimension indicator, a first movable member for operating said first electric circuit, and a second movable member actuatable by said first movable member and operating said second electric circuit subsequent to the operation of said first electric circuit by said first member, said first movable member and said second movable member being arranged for movement relative to each other, whereby said counter is operated prior to said indicator, said first member including first end means adapted to engage a work piece to be counted and measured, and second end means, respectively, adapted to actuate one movable part in said first electric circuit and another movable part connected to said second movable member, consecutively.

2. In a device for sorting work pieces, the combination of means for counting said work pieces and including first means for controlling the operation of a first electric circuit in response to passage of work pieces past said controlling means, with means for indicating a predetermined dimension of said work pieces and including second means operatively connectable with said first means for controlling the operation of a second electric circuit subsequent to the operation of said first electric circuit and in response to said passage of said work pieces past said controlling means.

3. A device for indicating a predetermined dimension of and for counting work pieces; comprising a frame, a passageway for said work pieces, a first movable member supported by said frame and extending partly into said passageway, a second member for guiding said first member during movement thereof, a first pair of contact means supported on said frame, one of said contact means of said first pair being engageable with said first member for controlling the operation of a first electric circuit, said second member being movable by and relative to said first member, a second pair of contact means, and means actuated by said second member for operating a second electric circuit in which at least one of said contact means of said second pair is included and subsequently to the operation of said first electric circuit, said one of said work pieces displacing said first member when passing through said passageway and then said second member, consecutively.

4. In a device according to claim 3, wherein said first movable member includes means intermediate the ends thereof for engagement with at least one of said contact means of said first pair.

5. In a device according to claim 3, wherein said second member includes a first cavity permitting displacement of said first movable member therein relative to said second member.

6. In a device according to claim 3, wherein said second member includes a second cavity, a spring accommodated in said second cavity and surrounding a portion of said first member, and means on said first member for retaining the latter within said first cavity and said second cavity, respectively.

7. In a device according to claim 6, wherein said first pair of contact means extends within said first cavity.

8. In a device according to claim 3, wherein said second pair of contact means includes means for indicating a maximum dimension of one of said work pieces and for indicating a minimum dimension of said one of said work pieces.

PAUL SCHAURTE.

References Cited in the file of this patent
UNITED STATES PATENTS

| Number | Name | Date |
|---|---|---|
| 2,227,937 | Koppelman | Jan. 7, 1941 |
| 2,433,585 | Warner | Dec. 30, 1947 |
| 2,569,090 | Booth | Sept. 25, 1951 |